W. J. THOMSON.
Tool-Handles.
No. 152,581. Patented June 30, 1874.
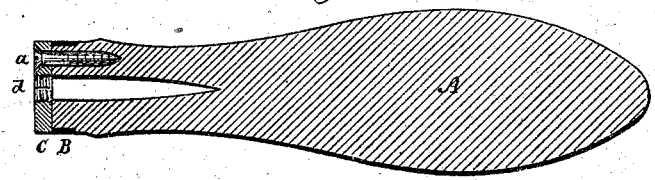

UNITED STATES PATENT OFFICE.

WILLIAM J. THOMSON, OF SEYMOUR, CONNECTICUT.

IMPROVEMENT IN TOOL-HANDLES.

Specification forming part of Letters Patent No. 152,581, dated June 30, 1874; application filed June 13, 1874.

*To all whom it may concern:*

Be it known that I, WILLIAM J. THOMSON, of Seymour, in the county of New Haven and State of Connecticut, have invented a new Improvement in Tool-Handle; and I do hereby declare the following, when taken in connection with the accompanying drawings and the letters of reference marked thereon, to be a full, clear, and exact description of the same, and which said drawings constitute part of this specification, and represent, in—

Figure 1, a perspective view, and in Fig. 2 a longitudinal section.

This invention relates to an improvement in wood handles, such as are applied to the tangs of files, chisels, &c., the object being to more firmly secure the handles, and prevent their accidental removal; and it consists in attaching a screw-cutting die to the ferrule end of the handle, by which a corresponding thread may be cut upon the tang of the tool, and the die serving to hold the tool after such thread has been cut, as more fully hereinafter described.

A is the handle of the usual form, and, preferably, fitted with a ferrule, B. On the ferrule end of the handle the die C is attached by screws *a* or otherwise, so as to make the die practically a part of the handle. The die is perforated and tapped, and one or more notches, *d*, cut across the thread, as in an ordinary screw-cutting die, so as to form thread-cutters in the die. The die is made of steel or other suitable metal, which may be hardened after the thread is cut.

When it is desired to attach the handle to a tool, the tang is inserted through the die C, and the handle turned while the tool is held; or, vice versa, the die cuts a corresponding thread on the tang, and draws the tang into the handle, from which it cannot be removed except by unscrewing. The better plan is to fit the tang so that the shoulder will come against the face of the nut, and, being there held by the screw, will greatly strengthen the connection between the tool and handle. In such case the tang need be only so long as the thickness of the die C, and thus save considerable expense in the manufacture of the tool.

With my improvement the same handle may be used for many tools having like tangs, the removal of a tool not in any degree loosening the same tool when again replaced.

I claim as my invention—

A tool-handle, A, having the screw-cutting die C attached, and made a part thereof, substantially as specified.

WILLIAM J. THOMSON.

Witnesses:
JAMES SNARE,
G. W. DIVINE.